United States Patent
Lagrut

(10) Patent No.: US 7,992,925 B2
(45) Date of Patent: Aug. 9, 2011

(54) VEHICLE WITH IMPROVED DOUBLE LEAFED DOOR SYSTEM

(75) Inventor: Jerome Lagrut, Miribel (FR)

(73) Assignee: Renault Trucks, Saint Priest (FR)

(*) Notice: Subject to any disclaimer, the term of this patent is extended or adjusted under 35 U.S.C. 154(b) by 286 days.

(21) Appl. No.: 12/444,406

(22) PCT Filed: Oct. 19, 2006

(86) PCT No.: PCT/IB2006/004012
§ 371 (c)(1), (2), (4) Date: Apr. 6, 2009

(87) PCT Pub. No.: WO2008/047175
PCT Pub. Date: Apr. 24, 2008

(65) Prior Publication Data
US 2009/0224569 A1 Sep. 10, 2009

(51) Int. Cl.
*B60J 7/00* (2006.01)
(52) U.S. Cl. ............ 296/187.09; 296/146.13; 296/146.6
(58) Field of Classification Search ............ 296/187.09, 296/187.1, 146.11, 146.1, 146.6, 146.9, 146.12, 296/190.11, 146.13
See application file for complete search history.

(56) References Cited

U.S. PATENT DOCUMENTS

| | | | | |
|---|---|---|---|---|
| 5,800,007 A | * | 9/1998 | Cho | 296/146.6 |
| 6,279,988 B1 | * | 8/2001 | Muraro | 296/190.11 |
| 6,601,910 B1 | * | 8/2003 | Duggan | 296/203.03 |
| 6,942,281 B2 | * | 9/2005 | Omori et al. | 296/187.1 |

FOREIGN PATENT DOCUMENTS

| | | |
|---|---|---|
| EP | 0779171 A | 6/1997 |
| EP | 1068970 A1 | 1/2001 |

OTHER PUBLICATIONS

International Search Report for corresponding International Application PCT/IB2006/004012, 2007.

* cited by examiner

Primary Examiner — Joseph D Pape
(74) Attorney, Agent, or Firm — WRB-IP LLP

(57) ABSTRACT

A vehicle has a door system having at least a front and a rear door leaf which are each movable between an open and a closed position with respect to the cabin structure. The vehicle includes a door locking system which is provided to lock the door leaves in their closed position in case of collision of the vehicle. The locking system includes a locking mechanism and a triggering mechanism having a front operational portion which is located in vicinity of a front end of the cabin structure so as to be displaced in case the front end of the cabin structure is deformed due to a collision, the displacement mechanically triggering the locking mechanism towards an engaged position.

16 Claims, 3 Drawing Sheets

VEHICLE WITH IMPROVED DOUBLE LEAFED DOOR SYSTEM

BACKGROUND AND SUMMARY

The invention relates to a vehicle having a cabin equipped with an improved door system.

The invention relates to a vehicle having a cabin located in the front of the vehicle to accommodate the driver. The invention will be of particular relevance in a vehicle having a "cab over engine" style of cabin, or an advanced cabin style. Contrary to a front engine vehicles, where the front end of the vehicle is formed by the engine compartment and where the cabin is located rearwards of that engine compartment, "cab over engine" vehicles have a cabin where the driver is seated above the engine, thus very close to the front end of the vehicle. In the case of an advanced cabin style, the driver may be seated in front of the engine. Such advanced cabin style can be for example found on special trucks dedicated for example to urban delivery or to garbage pickup.

"Cab over engine" design is very convenient in order to have a vehicle where the engine compartment and the cabin for the driver occupy only limited amount of a length. Such design is very popular in countries where the overall length of the truck is limited by law (such as in European countries for instance) so that a maximum of length can be used for accommodating the load to be carried.

Vehicles in general, and trucks in particular, usually have conventional doors, that is single-leaf doors which give access to the cabin through a door aperture in a cabin structure. The aperture extends between a front pillar of the cabin structure and a rear pillar. Conventionally, the door is hinged by its front edge on front pillar of the cabin structure, and it is equipped on its rear edge with a locking mechanism which, when the door is in a closed position, cooperates with a corresponding mechanism located on the rear pillar of the cabin structure to firmly hold the door in its closed position. The doors are usually made essentially of metal and are equipped with a window pane.

For some vehicles having specific usages, conventional door designs are not perfectly convenient. Such is the case for example for vehicles where the driver needs to get in and get out to the vehicle a higher number of times in the day, such as for delivery trucks. Indeed, due to the fact that such a conventional door is made up of only one door leaf, when the driver opens the door, he must be very cautious that there is no vehicle, no pedestrian or no cyclists which is passing alongside his vehicle because he might otherwise swing his door open and cause the passing vehicle, pedestrian or cyclist to hit the door. Moreover, if the aperture to which the door gives access has a big longitudinal dimension; the door having of course a corresponding dimension, the door can only be fully opened if there is enough lateral clearance between the vehicle and any object which might interfere (other vehicle, wall, etc.). For vehicles operating in rather cramped environment, such clearance might not always be available, making the access of the vehicle less convenient, if not impossible.

Certain vehicles are equipped with door systems having at least two leaves. Such multi-leaf door systems can be found especially in city buses. For example, the door system can be of the saloon-door type, having a front door leaf and a rear door leaf, the front door leaf being hinged to the vehicle structure by its front edge and the rear door leaf being hinged by its rear edge. As another example, the door system can be of a foldable door type with at least two leaves hinged one to the other by one of their edges, one of the leaves being also hinged on the cabin structure while the other leaf has a free edge which is slidingly guided along the structure. The door system can also have two such foldable doors on each side of the door aperture.

Such multi-leaf door systems are interesting because they need less lateral clearance between the vehicle and the environment. They also offer a good ease of access to the vehicle.

Nevertheless, contrary to conventional doors, such multi-leaf door systems are usually not designed in such a way to offer significant resistance is case of accident.

Nowadays, a conventional door system for a vehicle is designed such that, in its closed position, it is firmly attached to one pillar of the aperture by its hinges, and it is firmly attached to the other pillar by the locking mechanism. Therefore, in case of an accident, the door will stay in its closed position, and will block any movement of the front pillar towards the rear pillar of the cabin aperture. To achieve this in a most efficient manner, conventional doors are often equipped with a longitudinally extending reinforcing bars integral with the door structure.

On the other hand, multi-leaf door systems as described above are mostly used in vehicles such as city buses which are less prone to road accidents than usual road vehicles, such as trucks, or which are only subject to relatively low speed collisions.

One particular aspect of those multi-leaf systems is that they are usually not provided with any heavy duty lock mechanism, in order to provide for a fast and non obstructed opening of the door system. This means that, in case of a relatively high speed accident, involving the deformation of the cabin structure around the door aperture (which in many cases involves the front pillar moving in the direction of the rear pillar), multi-leaf door systems simply do not add any strength to the body structure, the doors having the tendency to open very easily under the efforts occurring due to the collision. This problem is even more acute when such door systems are designed with windowed door leaves where an extensive part of the door leaf is made of a glass window pane to achieve maximum visibility.

While that may be acceptable in specific uses such as in a city bus, which only travels at fairly low speed, it would not be acceptable on vehicles which, at least on some occasions, are to travel on the open road or at least on suburban roads at a higher velocity. This becomes even less acceptable in terms of safety for a front door system in a "cab over engine" design or in a advanced cabin style. Indeed, in such cab designs, the driver's door is located right in the front of the cabin, next to the front end of the cabin structure. This means that, in case of a frontal collision, it is crucial that the cabin structure around door aperture be reinforced in some way by the door in order to minimize the deformation of the cabin structure, in particular to minimize any backward movement of the front pillar towards the rear pillar. Indeed, any such movement results in reducing the cabin's internal volume, making the driver being more prone to coming into contact with a cabin element during the collision. As it is apparent, in "cab over engine" or "advanced cabin" designs, the driver is already very close to front end of the vehicle, which means that even a modest deformation of the structure can have devastating effects on the driver's safety.

On the other hand, the applicants have recognized that it would be of interest to have a multi-leaf door system as the front door system in a "cab over engine" or "advanced cabin" type truck in order to access to the known benefits of such systems which are e.g. easy access, small required lateral clearance for opening, and, in case of use largely windowed door leaves, maximum visibility for the driver Therefore, it is desirable to provide for a multi-leaf door system which could be used as the front door of a vehicle, while achieving a much higher level of safety in case of collision.

According to an aspect of the present invention, a vehicle is provided having a cabin, said cabin having a cabin structure and a door system, wherein said door system has at least a front and a rear door leaf which are each movable between an open and a closed position with respect to the cabin structure, said leaves closing a same aperture in the cabin structure when they are in their closed position, characterized in that said vehicle comprises:

a door locking system which is provided to lock the door leaves in their closed position in case of collision of the vehicle; said locking system comprising
a locking mechanism and
a triggering mechanism having a front operational portion which is located in vicinity of a front end of the cabin structure so as to be displaced in case the front end of the cabin structure is deformed due to a collision, said displacement mechanically triggering said locking mechanism towards an engaged position.

DETAILED DESCRIPTION

Figure 1:
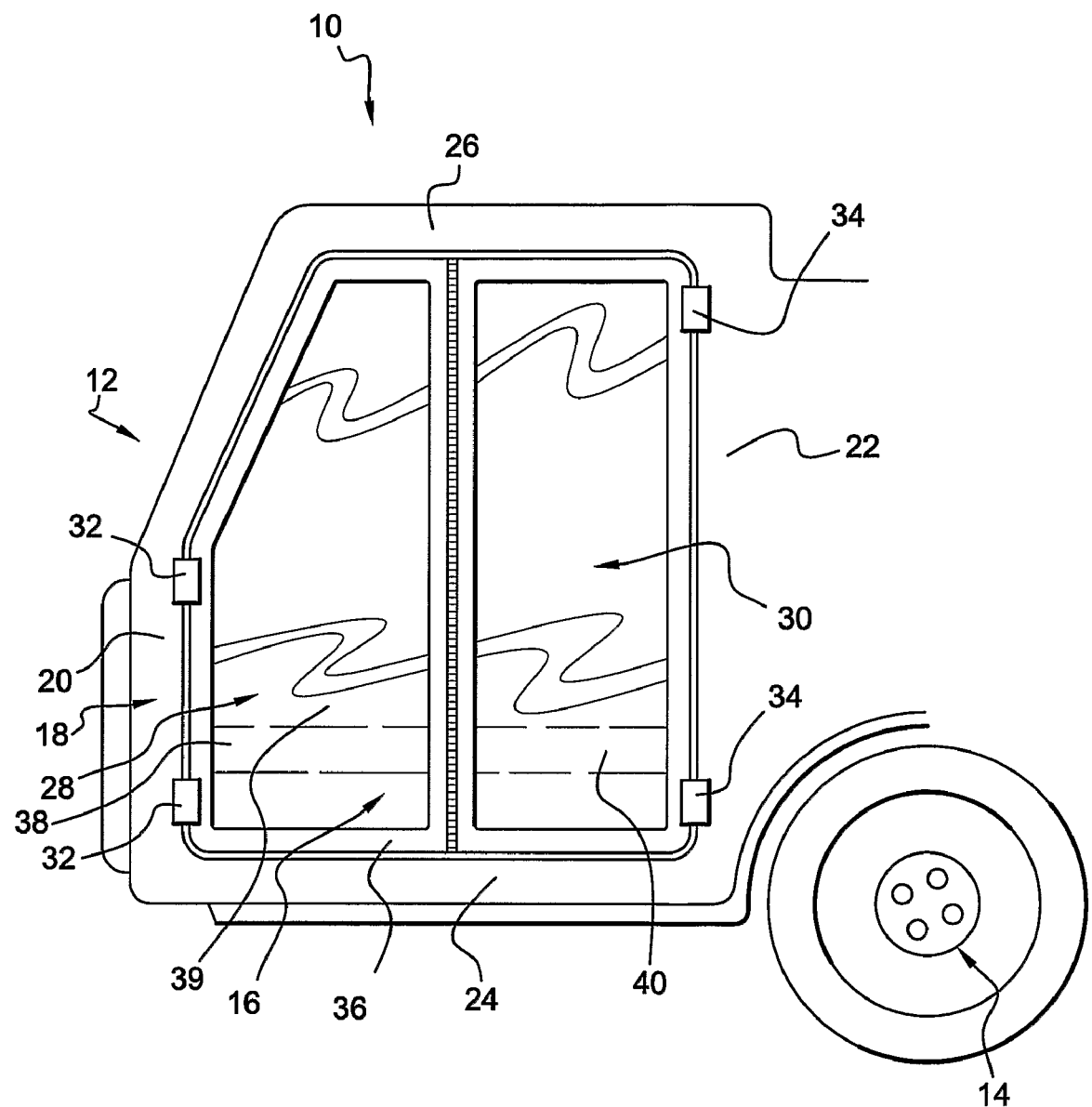
FIG. 1 is a schematic side view of a front part of a vehicle according to the invention.

On FIG. 1 is represented the front part of a truck 10 having a cabin 12 which is of the advanced cabin style. As it can be seen, this cabin 12 is located well in front of the front wheel 14 of the vehicle. For a truck, this cabin is located quite low, at a height comparable to that of a bus or even of a minivan. This cabin 12 has a door system 16 carried by a cabin structure 18. The cabin structure can be made in any conventional manner known in the truck industry. The door system 16 is located within a door aperture arranged on a side of the cabin structure. Basically, the door aperture is delimited within the cabin structure 16 by a front pillar 20 and a rear pillar 22, a bottom section 24 and a top section 26. As it is apparent from the figures, the door aperture is located at the front end of the cabin structure, and in this particular case, entirely or at least substantially in front of the wheel 14. In this example, the door aperture has a substantially rectangular configuration, with only the front pillar having a top part slightly bended towards the rear.

According to one feature of the invention, the door system comprises a multi-leaf door, that is it comprises at least two leaves which are movable each between an open position, wherein the door leaves give access to the cabin through the door aperture, and a closed position wherein the two leaves close the door aperture. The number of leaves and their specific movements with respect to the cabin structure may vary. In the example shown, the door system can be described as being of the saloon door type and comprises only two leaves, a front leaf 28 and the rear leaf 30. The front leaf 28 is simply hinged by its front edge on the front pillar 20 by hinges 32 so as to open by a pure rotational movement around the vertical axis defined by said hinges 32. The rear leaf 30 is hinged by its rear edge on the rear pillar 22 by hinges 34 so as to open by a pure rotational movement around the vertical axis defined by said hinges 34. Nevertheless, the invention that is not limited to such specific arrangement. Indeed, the door system could comprise more than two leaves and/or the leaves could be linked to the structure through a mechanism having a more complex cinematic that a simple hinge and/or could be of another type, such as the foldable door type.

In the example shown, each door leaf 28, 30 is of very simple and light construction. Each leaf has a peripheral frame 36, for example made of extruded metal, on which is affixed a door panel, said panel being for example a window pane 39. Such a windowed construction ensures that a driver inside the cabin has maximum visibility through the door system, which is a plus for urban or suburban use.

In a normal operation of the vehicle, the two window panes are substantially flush with the side of the vehicle when they are in their closed position. To move to their open position, the free edge of each door leaf (that is the rear edge for the front leaf and the front edge for the rear leaf), swing outwardly around the vertical axis of the relevant hinges. The opening and closing movements can be purely manual, that is directly operated by a user of the vehicle, or can also be power driven through any kind of electric, pneumatic or a hydraulic actuator. The door system can also comprise an access lock mechanism which would prevent the door system from being opened by a non-authorized person. Such access lock mechanism is not described here. In any case, such access lock mechanism would most probably not be locked during normal operation of the vehicle. Indeed, the vehicle might be used in such a way as to necessitate that the driver or any other passenger in the cabin would need to go in and out of the cabin very frequently. In such a case, in order to gain time, that driver or passenger will tend to do everything possible to make the opening and closing of the door system as quick and effortless as possible. Indeed, it is well know that in a delivery trucks having a sliding door, the driver or a deliveryman very often blocks the door in its open position even when driving, which is of course totally unsafe.

Therefore, the door system according to the invention is supposed to be closed when the vehicle is driving. In some cases, to make sure it is really the case, it may be necessary to provide either an automatic closure of the door system and/or a system for preventing the vehicle to move unless the door system is in its closed position and/or at least an alarm system.

According to one aspect of the invention, the door system is provided with a door locking system which locks the door leaves in their closed position in case of collision of the vehicle. According to another aspect of the invention, the locking of this locking system is achieved through a purely mechanical system which does not involve any specific electronic control system or any specific power actuator to operate.

Firstly, one can see that, in the embodiment described, each door leaf 28, 30 comprises a reinforcing element 38, 40 which extends longitudinally across the door leaf, from a front edge of the to a rear edge of the respective door leaf. For example, each reinforcing element 38, 40 could be a tubular metal element welded at each end to the corresponding vertical parts of the frame 36. The two front and rear reinforcing elements 38, 40 are located on their respective door leaves so as to be longitudinally aligned and so that, together, they extend substantially across the whole width of the door aperture. The front end of the front reinforcing element 38 is adapted to almost abut longitudinally against the front pillar 20, with only a functional clearance. The rear end of the rear reinforcing element 38 is adapted to almost abut longitudinally against the rear pillar 20, with only a functional clearance. When the door leaves are in their closed position, the rear end of the front reinforcing element 38 and the front end of the rear reinforcing element 40 are face to face and adapted to abut one against the other in case of collision.

In this embodiment, the locking mechanism comprises a locking element 42 which is in the form of a rod slidingly guided by two bearings 44 inside or on the reinforcing elements 38 of the front door leaf 28. The locking rod 42 has substantially the same dimension has the reinforcing element 38 in the longitudinal direction. The locking element 42 can slide longitudinally from front to rear with respect to the door leaf 28 between a retracted position shown on FIG. 2 and an engaged position show on FIG. 3. In its retracted position, the locking element 42 is entirely comprised within the area defined by the peripheral frame of the door leaf 28. To the contrary, when it is in its engaged position, the locking element 42 has its rear end which forms a latching portion by protruding out of the area defined by the peripheral frame of the door leaf 28 so as to be engaged within a corresponding hole 45 provided in a block 47. Said block 47 can be integral with the reinforcing element 40 of the rear door leaf 30. Therefore, at least of by virtue of its rear end being engaged with block 47 of the rear door leaf, the locking element 42 acts as a latch and locks the two door leaves together when it is in its engaged position.

Moreover, the locking mechanism shown in this embodiment also comprises two vertically sliding latching bars 46, 48 which are carried by the front door leaf 28. A top latching bar 46 is for example slidingly mounted within the rear vertical part of frame 36 between a lower retracted position shown on the FIG. 2 and a higher engaged position shown on FIG. 3. The top latching bar 46 is arranged in an upper part of the door leaf 28 with respect to the reinforcing element 38 on which the locking element 42 is situated. In its engaged position, the top end of the top latching bar 46 protrudes out of the area defined by the peripheral frame of the door leaf 28 so as to be engaged within a corresponding hole 50 provided in the top section 26 of the cabin structure. The lower end of the top latching bar 46 is connected to the locking element 42 via a connecting rod 52 which is hinged both on the latching bar 46 and on the locking element 42. In the retracted position of the locking mechanism, the connecting rod 52 is in an inclined position where it extends upwardly and rearwardly from the locking element.

Figure 2:
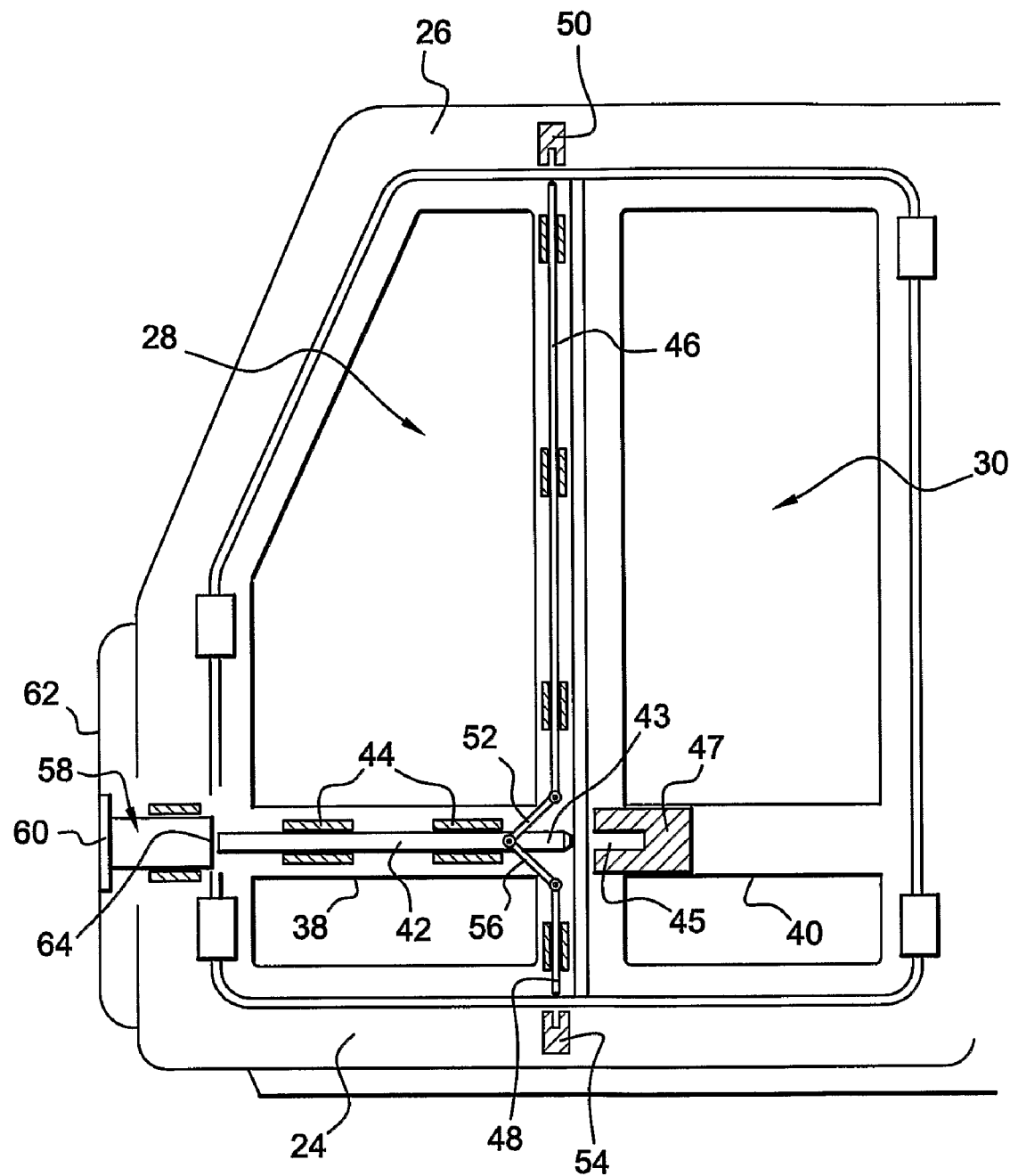
FIG. 2 is a schematic cut out view showing the door locking system for the vehicle according to the invention, the door locking system being in an unlocked configuration before the occurrence of a collision.
Figure 3:
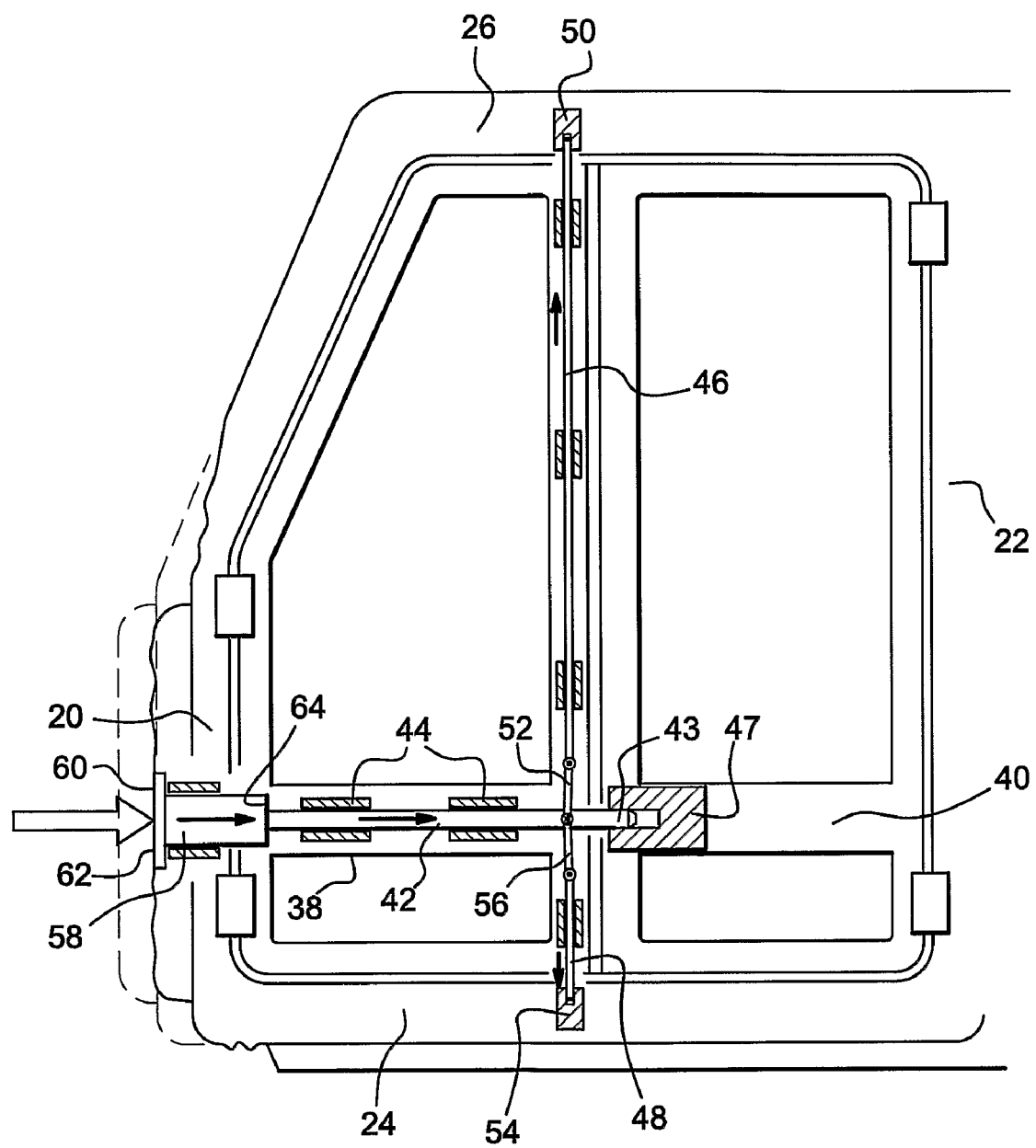
FIG. 3 is a view similar to that of FIG. 2 showing the door locking mechanism in its locked configuration after the occurrence of a collision.

Similarly, the bottom latching bar 48 is slidingly mounted within the rear vertical part of frame 36 between a higher retracted position shown on FIG. 2 and a lower engaged position shown on FIG. 3. The bottom latching bar 48 is arranged in the lower part of the door leaf with respect to the reinforcing elements 38. In its engaged position, the bottom end of the bottom latching bar 48 protrudes out of the area defined by the peripheral frame of the door leaf 28 so as to be engaged with a corresponding hole 54 provided in the bottom section 24 of the cabin structure. The upper end of the bottom latching bar 48 is connected to the locking element 42 via a connecting rod 56 which is hinged both on the latching bar 48 and on the locking element 42. In the retracted position of the locking mechanism, the connecting rod 56 is in an inclined position where it extends downwardly and rearwardly from the locking element 42.

With this construction, when the locking element 42 slides rearwardly towards its engaged position, it pushes simultaneously, via the two connecting rods 52, 56, the two latching bars 46, 48 towards their engaged position so as to lock the front door leaf with respect to the cabin structure.

Therefore, in this embodiment, the locking mechanism comprises a locking element 42 which has a locking portion to lock the door leaves together, and two latches 46, 48 which are controlled by said locking element 42 and which lock the door leaves with respect to the cabin structure.

According to an aspect of the invention, the door locking system comprises a triggering mechanism capable of, in case of a frontal collision of the vehicle, mechanically triggering the locking mechanism towards its engaged position. In this embodiment, the triggering mechanism is carried by the cabin structure and at least a first operational portion of the triggering mechanism is located near a most vulnerable part of the front end of the cabin structure.

In the shown embodiment, the triggering mechanism comprises a triggering rod 58 which is slidingly guided on the cabin structure along a substantially horizontal direction. The triggering rod 58 has a front-end 60 which is arranged so as to be in the in vicinity of the front end of the cabin structure. For example, in the depicted advanced cabin style, the cabin structure may have a vertical front lid 62 and the front end 60 of the triggering rod 58 would be located just behind said front lid 62. The triggering rod 58 has a second operational portion, here its rear end 64, which is intended to contact the locking mechanism and to trigger it towards its engaged position in case of collision. Indeed, in the example shown, the rear end 64 of the triggering rod is located within the front pillar 20 of the cabin structure just opposite of the front end the of the reinforcing element 38 of the front door leaf 28, therefore also just opposite the front end of the locking element 42. In its normal position shown on FIG. 2, the triggering rod 58 is preferably entirely comprised within the cabin structure. To the contrary, it is intended that, in case of a frontal collision of the vehicle with another vehicle or with an obstacle, the radiator grille 62 will be pushed backwards with respect to the cabin structure and will provoke a corresponding movement of the triggering rod 58. As, shown on FIG. 3, this movement of the triggering rod 58 will cause its rear end 64 to come into contact with the front end of the locking element 42 and will push this locking element rearwardly toward its engaged position. Of course, the rearward movement of the locking element will be proportional to the deformation of the cabin structure. When the locking element will have reached its engaged position, it causes the door leaves to be locked together and locked with respect to the top and bottom sections 24, 26 of the cabin structure.

At that moment, the locking mechanism will achieve a locking of the door system in its closed position, preventing, at least to a certain extent, the door leaves from opening under the forces due to the collision.

Once locked in the above described manner within the door aperture, the door leaves 28, 30 will participate in reinforcing the cabin structure. Especially, the two reinforcements elements 38, 40 carried by the two door leaves will remain longitudinally aligned across the door aperture, between the front pillar 20 and the rear pillar 22. This is achieved both indirectly because they are carried by the door leaves which are locked in their closed position, and directly because the locking element 42 is carried by the front reinforcing element 38 and engages block 47 carried by the rear reinforcing element 40, thereby uniting the two elements 38, 40 into one solid reinforcement bar. Therefore, if the front pillar 20 tends to move rearwardly under the impact, it will be supported longitudinally by the two reinforcing elements 38, 40 which themselves will be blocked longitudinally towards the rear by the rear pillar 22. Indeed, the reinforcing elements 38, 40 will be dimensioned so as to be able to withstand a substantial amount of forces, especially along the longitudinal direction.

According to the invention, the triggering mechanism is purely mechanical in that it is directly the deformation of the cabin structure which causes the movements of the locking mechanism towards its engaged position. The triggering mechanism according to the invention does not need any electric or electronic control device, nor does it need any powered actuator, which makes it simple, affordable, and reliable. Therefore, the door system according to the invention is fully effective to achieve a high security standard and very low in price.

Of course, the invention could be carried out with various types of locking mechanism and various types of triggering mechanisms. For example, the triggering mechanism could be different from a simple sliding rod. It could have at least one articulated part in order to transmit movements along different directions.

Similarly, the locking mechanism has been described as having a sliding rod and two latches, but it also could be constructed differently as long as of the mechanism can be controlled by a mechanical triggering system and achieves a locking of the door leaves with respect to the cabin structure.

The invention claimed is:

1. A vehicle having a cabin, the cabin having a cabin structure and a door system, wherein the door system has at least a front and a rear door leaf which are each movable between an open and a closed position with respect to the cabin structure, the leaves closing a same aperture in the cabin structure when they are in their closed position, wherein the vehicle comprises:
    a door locking system which is provided to lock the door leaves in their closed position in case of collision of the vehicle; the locking system comprising
    a locking mechanism and
    a triggering mechanism having a front operational portion which is located in vicinity of a front end of the cabin structure so as to be displaced in case the front end of the cabin structure is deformed due to a collision, the displacement mechanically triggering the locking mechanism towards an engaged position.

2. A vehicle according to claim 1, wherein the triggering mechanism has a second operational portion, which is caused to be displaced following a displacement of the front operational portion towards a triggering position where the second operational portion is in contact with the locking mechanism to mechanically trigger the locking mechanism towards the engaged position.

3. A vehicle according to claims 1, wherein the triggering mechanism is carried by the cabin structure.

4. A vehicle according to claim 1, wherein the first operational portion of the triggering mechanism is located near a most vulnerable part of the front end of the cabin structure.

5. A vehicle according to claim 1, wherein the triggering mechanism comprises a rod which is slidingly guided on the cabin structure.

6. A vehicle according to claim 1, wherein the cabin structure has a front pillar and a rear pillar which delimit the aperture, and wherein each door leaf has at least one reinforcing element extending longitudinally across the door leaf so that the reinforcing elements of the door leaves are longitudinally aligned across the length of the aperture.

7. A vehicle according to claim 1, wherein the door locking mechanism comprises a locking element which is movable from a disengaged position to the engaged position wherein it participates in locking the door leaves in their closed position.

8. A vehicle according to claim 7, wherein the locking element is carried by the front door leaf.

9. A vehicle according to claim 7, wherein the locking element mechanically controls at least one latch, the latch being carried by one of the door leaves and being brought into engagement with a part of the cabin structure when the locking mechanism is moved to its engaged position.

10. A vehicle according to claim 8, wherein the locking element has at least one latching portion, the latching portion being brought into engagement with a part of the cabin structure when the locking mechanism is moved to its engaged position, so as to lock the front door leaf with respect to the cabin structure.

11. A vehicle according to claim 8, wherein the locking element has at least one latching portion, the latching portion being brought into engagement with a corresponding latching part carried by the rear door leaf when the locking mechanism is moved to its engaged position, so as to lock the two door leaves together.

12. A vehicle according to claim 11, wherein the cabin structure has a front pillar and a rear pillar which delimit the aperture, and wherein each door leaf has at least one reinforcing element extending longitudinally across the door leaves so that the reinforcing elements of the door leaf are longitudinally aligned across the length of the aperture, in that the locking element is carried by the reinforcing element of the front door leaf, and in that the latching part is carried by the reinforcing element of the rear door leaf.

13. A vehicle according to claim 12, wherein at least one of the door leaves comprises a structural frame on which is affixed at least one door panel, and in that the reinforcing element is a part of the structural frame.

14. A vehicle according to claim 13, wherein the door leaf panel is a window pane.

15. A vehicle according to claim 6, wherein at least one of the door leaves comprises a structural frame on which is affixed at least one door panel, and in that the reinforcing element is a part of the structural frame.

16. A vehicle according to claim 15, wherein the door leaf panel is a window pane.

* * * * *